(12) United States Patent
Capuzzello

(10) Patent No.: US 11,909,883 B2
(45) Date of Patent: Feb. 20, 2024

(54) METHOD FOR IDENTIFICATION AND AUTHENTICATION OF OBJECTS, AND SYSTEM FOR IMPLEMENTING THE METHOD

(71) Applicant: KRUPTEIA S.R.L., Lecce (IT)

(72) Inventor: Alessandro Capuzzello, Moncalvo (IT)

(73) Assignee: Krupteia S.R.L., Lecce (IT)

( * ) Notice: Subject to any disclaimer, the term of this patent is extended or adjusted under 35 U.S.C. 154(b) by 417 days.

(21) Appl. No.: 17/361,514

(22) Filed: Jun. 29, 2021

(65) Prior Publication Data
US 2022/0294633 A1    Sep. 15, 2022

(30) Foreign Application Priority Data
Mar. 9, 2021    (IT) .................. 102021000005492

(51) Int. Cl.
*H04L 9/32* (2006.01)
*A63F 13/73* (2014.01)
(Continued)

(52) U.S. Cl.
CPC ............ *H04L 9/3234* (2013.01); *A63F 13/73* (2014.09); *G06N 20/00* (2019.01); *G06V 40/1365* (2022.01); *H04L 9/0897* (2013.01)

(58) Field of Classification Search
CPC ..... H04L 9/0897; H04L 9/3234; H04L 63/08; H04L 63/0876; G06F 21/44;
(Continued)

(56) References Cited

U.S. PATENT DOCUMENTS

| | | |
|---|---|---|
| 8,469,282 B2 | 6/2013 | Freeman |
| 10,074,225 B2 | 9/2018 | Somani et al. |

(Continued)

FOREIGN PATENT DOCUMENTS

| | | |
|---|---|---|
| EP | 3 208 744 A1 | 8/2017 |
| WO | 2004/066199 A2 | 8/2004 |

(Continued)

OTHER PUBLICATIONS

European Search Report dated Nov. 26, 2021, issued in EP Application No. EP21179126.4.

*Primary Examiner* — Minh Dinh
(74) *Attorney, Agent, or Firm* — Workman Nydegger

(57) ABSTRACT

A method for identification and authentication of objects includes providing a central electronic system, including a database; providing at least one electronic user device; and providing one or more physical entities, each physical entity being equipped with a message reception and transmission system comprising a secure chipset storing digital identifiers and encryption keys of said physical entity. The at least one user device interrogates the central electronic system in order to receive authentication data of one or more of the physical entities, entered in said database. In reply, the at least one user device receives the authentication data and sends authentication request messages to the one or more physical entities. The at least one user device receives replies to the authentication request messages from at least one of the one or more physical entities, including parameters and digital identifiers of the user devices and, based on the parameters, performs an acquisition of at least one video image of the physical entity.

7 Claims, 10 Drawing Sheets

(51) Int. Cl.
*G06N 20/00* (2019.01)
*G06V 40/12* (2022.01)
*H04L 9/08* (2006.01)

(58) Field of Classification Search
CPC .... G06F 21/602; G06F 21/6218; A63F 13/71; A63F 13/73; A63F 13/79; A63F 2300/532; G06N 20/00; G06V 10/764; G60V 40/1365; G06Q 30/018; G06Q 2220/00
See application file for complete search history.

(56) References Cited

U.S. PATENT DOCUMENTS

| | | | |
|---|---|---|---|
| 10,193,695 | B1 | 1/2019 | Endress et al. |
| 11,075,766 | B1* | 7/2021 | Norton .................. H04L 9/0819 |
| 2005/0289061 | A1 | 12/2005 | Kulakowski et al. |
| 2016/0358186 | A1* | 12/2016 | Radocchia ............ H04W 12/02 |
| 2019/0236614 | A1 | 8/2019 | Burgin et al. |
| 2020/0266984 | A1* | 8/2020 | Endress .................. H04L 63/12 |
| 2021/0110004 | A1* | 4/2021 | Ross ....................... H04L 63/10 |

FOREIGN PATENT DOCUMENTS

| | | | |
|---|---|---|---|
| WO | 2007/027151 | A1 | 3/2007 |
| WO | 2017/080975 | A1 | 5/2017 |
| WO | 2019/211178 | A1 | 11/2019 |

\* cited by examiner

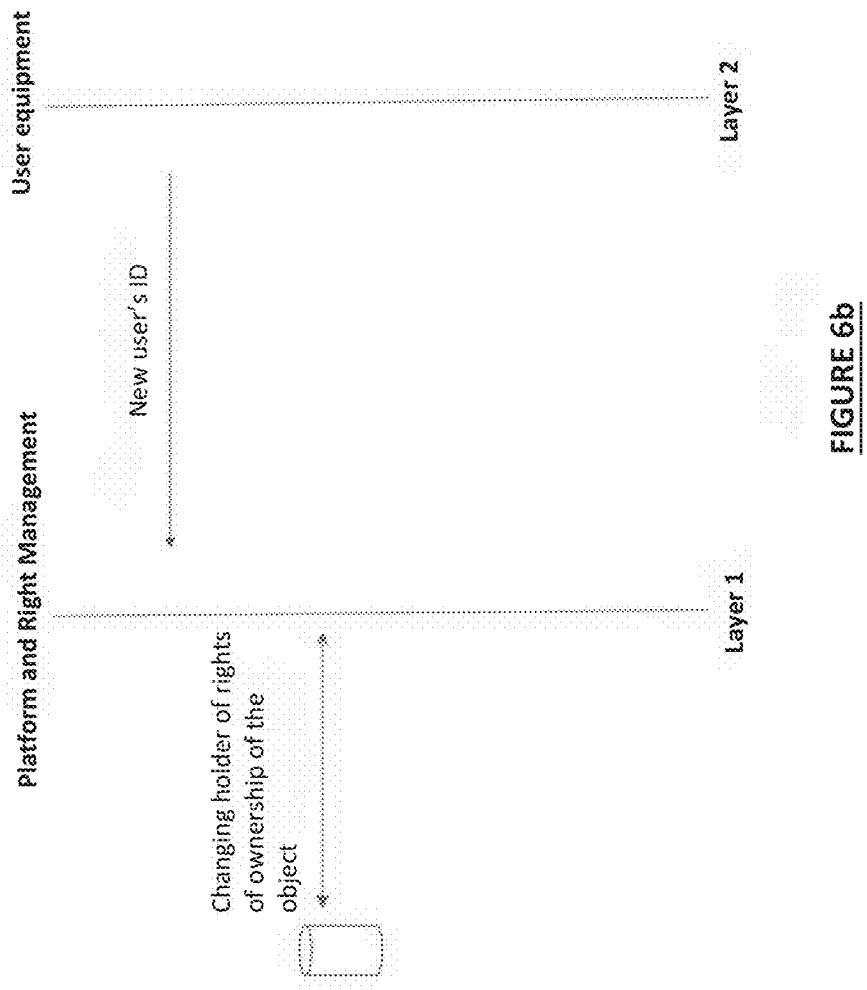

METHOD FOR IDENTIFICATION AND AUTHENTICATION OF OBJECTS, AND SYSTEM FOR IMPLEMENTING THE METHOD

CROSS-REFERENCE TO RELATED APPLICATIONS

This application claims priority to Italian Application No. 10-2021-000005492, filed Mar. 9, 2021, which is incorporated herein by specific reference.

FIELD OF THE INVENTION

The present invention relates to a method for identification and authentication of objects, and to a system for implementing the method.

BACKGROUND ART

Systems for identification and authentication of objects are known in the art, like those described in the patents and patent applications commented upon below.

U.S. Pat. No. 10,193,695 B1 describes a system and a method of receiving object data representing one or more discriminating characteristics of a physical object or group of physical objects. The method includes: processing the object data by means of a machine-learning-based object recognition process to obtain discriminating data representing one or more collision-resistant virtual representations of the physical object or group of physical objects; comparing at least one of the discriminating data and an original hash value derived therefrom by application of a pre-determined cryptographic hash function thereto with corresponding reference data stored in one or more data repositories with restricted access; and, if said comparison with the reference data results in a match, outputting digitally signed identification data comprising said hash value.

U.S. Pat. No. 8,469,282 B2 describes a security tag made by randomly distributing a mixture of large numbers of multi-coloured objects into a unique, non-reproducible geometric array and encapsulating it onto a substrate. The 3D aspect of the objects will prevent printing or 2D copying of the associated stamp. The data, saved to a secure database, can be processed and quantities can be calculated from the field of binary data and can be affixed to the part that the stamp is affixed to. For one level of authentication, the array can be read out by the scanner and compared with values printed on the part of the object whereto the stamp is affixed. For an additional level of authentication, the array can be read out by optical scanner and compared with the data stored in the secure database. A security tag is capable of replacing 2D barcodes while containing only information capable of being scanned by 2D barcode scanners.

Patent application WO 2019/211178 A1 relates to the field of tracing and anti-counterfeit protection of objects, e.g., products, and particularly to automatic recognition and authentication of such objects. Specifically, it relates to a system and a method of receiving object data representing one or more discriminating characteristics of a physical object or group of physical objects. The method comprises: processing the object data by means of a machine-learning-based object recognition process to obtain discriminating data representing one or more collision-resistant virtual representations of the physical object or group of physical objects; comparing at least one of the discriminating data and an original hash value derived therefrom by application of a pre-determined cryptographic hash function thereto with corresponding reference data stored in one or more data repositories with restricted access; and, if said comparison with the reference data results in a match, outputting digitally signed identification data comprising said hash value. Potential applications of the invention comprise, in particular, object authenticity checks for track & trace and anti-counterfeiting purposes, e.g., in the fields of automotive/aerospace spare parts, 3D-printed objects, pharmaceutical products or other health-related products, such as healthcare products, lab disposables and clinical test disposables.

Patent application WO 2004/066199 A3 relates to a visual tag having a processor for calculating a response string corresponding to a challenge string, and a changeable screen to display the response string in machine-readable symbols. An authentication device reads the displayed symbols, and authenticates the displayed contents corresponding to the challenge string. The challenge string is generated either according to a random generator within the authentication device or according to a real-time clock. A plurality of tags or objects can be authenticated and spotted within an image. The tag can also authenticate inputted messages and credentials.

Patent application WO 2017/080975 A1 relates to authentication features that are visible, can be authenticated with a mobile equipment and yet are challenging to counterfeit. In a possible embodiment, the surface of the authentication feature may have three-dimensional characteristics, which can be recognized by a hand-held camera, such as a smartphone camera, while it cannot be easily reproduced by a simple scan and print procedure. In a further possible embodiment, at least two different viewpoints of the authentication feature may be acquired using a smartphone camera and the resulting images may be analyzed using the smartphone processor to identify the three-dimensional characteristics of the authentication feature. The manufacturing of the feature may be performed at a low cost by embossing the three-dimensional structure on a surface. The authentication feature may be carried by a self-adhesive label or directly embedded on the product packaging.

U.S. Pat. No. 10,074,225 B2 describes a secure short-distance-based communication and enforcement system that validates users in a validation and enforcement area and can check if users in the validation and enforcement area have been validated. A flow of visual objects may be programmed into an enforcement computer and used for the validations.

Patent application US 2005/0289061 A1 describes a system and a method for authenticating collectable items using a unique identifier housed within a collectable item or attached to a collectable item, a unique identifier reader, and an authentication authority database. Cryptographic techniques and unique authentication data increase the authentication strength of a collectable item and establish ownership lineage of a collectable item.

The above-described known systems concern object identification and authentication solutions based either on tags affixed to objects or on worked surfaces of the object, for the purpose of facilitating the identification thereof.

One of the main limitations of the solutions known in the art lies in the fact that identification and authentication of the object is effected by either using displayable processing or features, the reproduction of which is intentionally made difficult, or tags or other systems affixed to the object in order to permit the recognition thereof. However, if one succeeds in reproducing the modifications made to the object, then the object may be subject to counterfeiting. If the tag (or anything that may have been affixed to the object)

is removed and reproduced in large quantities, then a whole series of objects may be counterfeited. The most important drawback of the systems known in the art is that no system exists which, by using sophisticated methods, involves third parties in the verification of the authenticity of products which they do not own.

SUMMARY OF THE INVENTION

Therefore, it is the object of the present invention to propose a method for identification and authentication of objects, as well as a system for implementing the method, which are aimed at overcoming all of the above-mentioned problems.

In order to overcome the limitations of prior-art solutions, an anti-counterfeit solution is proposed herein which, by using a gamification-type stimulus, brings the users to authenticate the products they come in contact with.

The term "gamification" typically refers to using game dynamics and mechanics in order to cause people to feel more involved in daily activities. In some services, game dynamics are used for the purpose of making the users more active.

Gamification is enabled for identification and authentication of the object with which rights are associated which concern a number of services that allow gamification or even gaming mechanisms among those users who own such rights.

A system and a method for providing services, including so-called gamification services, are thus provided for identified and authenticated objects, in order to prevent counterfeiting of such objects.

In the proposed system and method, the object is authenticated by means of both a secure chipset applied to the object and visual and/or sensory authentication of such object, and diversified services are provided which depend on the user's rights on the object.

The method of the invention permits authenticating and identifying objects (e.g., fashion products) by establishing a connection between the characteristics of the object (shape, colour, or even dimensions) and a secure device (e.g., a chipset) that stores its digital characteristics, such as the unique identifier, digital security and, preferably, additional augmented reality or virtual reality contents customized in order to make that product unique.

The additional contents that characterize the product are initially originated by the product manufacturer, but may be further modified, changed or customized by another subject, e.g., the owner of the object.

It is therefore possible to employ artificial intelligence and machine learning techniques, for example, to enhance the visual recognition of the object and/or to enrich it with additional contents by using augmented reality and virtual reality systems, for the purpose of activating gamification processes based on the intrinsic and augmented characteristics of the object.

The present system and method make it possible to authenticate and identify physical entities (i.e., objects) by means of a system operating on three layers:
- a first layer consisting of a central system, including a database,
- a second layer consisting of user devices, and
- a third layer consisting of physical entities equipped with a message reception and transmission system comprising a secure chipset storing digital identifiers and encryption keys of each physical entity.

The user device activates the method by interrogating the first-layer system; in reply, it receives from the latter data useful for the authentication of one or more physical entities and conveys said data into messages that are sent to each individual physical entity.

The user device collects the replies to said messages sent by the physical entities and performs, on the basis of parameters received from each physical entity, such as detection distance and geometric shape of the physical entity, an acquisition of a video (or even just a simple image) of the same entity, which is then sent, along with said messages, to the first-layer system.

By using the encryption keys contained in the first-layer database, the digital identity of the physical entity is extracted from said messages, while from the video (or image) a visual recognition is performed by using fingerprinting or AI (Artificial Intelligence) techniques, or a combination thereof.

The visual recognition is compared with the visual recognition data stored in the database and relating to said digital identity; if they match, each entity will be individually identified and authenticated.

In the database, a verification is made on the rights owned by the second-layer user device that started the procedure as concerns the interrogated, identified and authenticated physical entity.

Based on said rights, different gamification services or gaming services and the like are preferably provided for the purpose of promoting the activity in question by the user. Such activities represent, in practice, a further measure against counterfeiting of the physical entities involved.

The present invention concerns a method for identification and authentication of objects, which comprises:
  providing a central electronic system, including a database;
  providing at least one electronic user device;
  providing one or more physical entities, each physical entity being equipped with a message reception and transmission system comprising a secure chipset storing digital identifiers and encryption keys of said physical entity;
  said at least one user device interrogates said central electronic system in order to receive authentication data of one or more of said physical entities, entered in said database;
  in reply, said at least one user device receives said authentication data and sends authentication request messages to said one or more physical entities;
  said at least one user device receives replies to said authentication request messages from at least one of said one or more physical entities, comprising parameters and digital identifiers of said user devices and, based on said parameters, performs an acquisition of at least one video image of said physical entity;
  either
  said at least one user device sends said messages and said video acquisition to said central electronic system;
  said central electronic system extracts from said messages a digital identity of said at least one or more physical entities and, based on encryption keys contained in said database, authenticates a digital identity of said at least one or more physical entities, and performs a visual recognition of said video acquisition by using fingerprinting (FR) and/or artificial intelligence (AI) techniques;
  said central electronic system compares said visual recognition with data about said visual recognition contained in said database, comprising said authentication data; if the comparison is successful, then said central electronic system will identify and authenticate each one of said at least one or more physical entities;

or said at least one user device extracts from said messages a digital identity of said at least one or more physical entities and, based on encryption keys included in said authentication data received from the central electronic system, authenticates a digital identity of said at least one or more physical entities, and performs a visual recognition of said video acquisition by using fingerprinting (FR) and/or artificial intelligence (AI) techniques, and compares said visual recognition with data about said visual recognition received from the central electronic system; if the comparison is successful, said at least one user device will identify and authenticate each one of said at least one or more physical entities.

It is a particular object of the present invention to provide a method for identification and authentication of objects, and a system for implementing the method, as set out in the claims, which are an integral part of the present description.

BRIEF DESCRIPTION OF THE DRAWINGS

Further objects and advantages of the present invention will become apparent from the following detailed description of an exemplary embodiment (and variants thereof) provided with reference to the annexed drawings, which are only supplied by way of non-limiting example, wherein:

FIGS. 4, 5, 5b, 6 and 6b show some explanatory block diagrams of specific variant embodiments of the method for identification and authentication of objects according to the present invention.

In the drawings, the same reference numerals and letters identify the same items or components.

DETAILED DESCRIPTION OF EMBODIMENT EXAMPLES

The present invention represents a solution against counterfeiting which, by using the gamification stimulus, brings the users to authenticate the products they come in contact with. Gamification is enabled for identification and authentication of the object with which rights are associated which concern a number of services that allow gamification or even gaming mechanisms among those users who own such rights.

Reference will be made below to virtual reality (VR) and augmented reality (AR) systems.

Virtual reality (VR) refers, as described in the technical literature, to which reference can be made for further details, to simulating the actual reality with the possibility of navigating or moving within the reality-simulating environment and interacting with objects that are present therein. Typically, virtual reality is created through the use of devices such as computers, gaming consoles, smartphones, visors, and the like, wherein the virtual context is displayed on normal screens.

Augmented reality (AR) refers, as described in the technical literature, to which reference can be made for further details, to enriching the human sensory perception by means of information electronically conveyed on the fruition device.

In an AR, the elements that "augment" the visual reality can be added by means of a mobile device, e.g., a smartphone, or a PC equipped with a webcam or other sensors that add multimedia information to the normally perceived reality. Exploring cities by pointing a smartphone and robotic surgery are some examples of useful applications of augmented reality.

Figure 1:
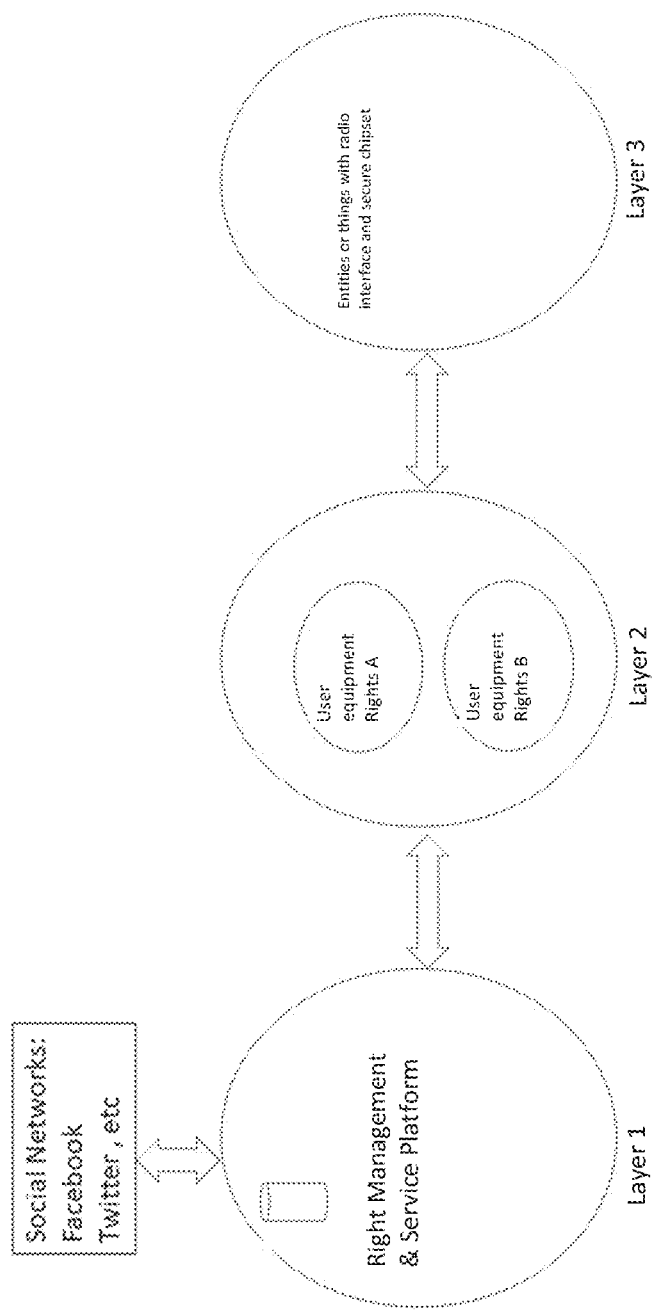
FIGS. 1, 2, 2a, 2b and 3 show some explanatory block diagrams of the method for identification and authentication of objects according to the present invention.

The system of the invention comprises three main layers, as shown in FIG. 1.

The first layer (layer 1) comprises a platform with a database of public and private keys associated with both the object identifiers (or, more in general, entities; for simplicity, the term "object" will be used below, which will however implicitly refer to many different entities, including plants, animals, people or things) and the devices controlled by the users for accessing services differentiated in accordance with the user's rights on such objects.

The users' rights on the various objects are managed and stored in said database.

The first layer preferably comprises an interface towards the most important social networks, from which the contacts of a given user can be downloaded, if requested and authorized by the same user, from which different categories of rights can be derived; for example, on a given platform (i.e., Facebook) the friends of the owner of the object (or entity) may be granted specific access rights and receive diversified services.

The second layer (layer 2) comprises the user devices accessing the services. The user devices may be smartphones, tablets, PCs, gaming consoles, advanced visors—as well as future evolutions thereof—and the like, so long as they are equipped with a processor, a memory, a display apparatus, a camera and a reception/transmission system (including power supply units, amplifiers and any other thing normally used in common consumer electronics).

The third layer (layer 3) comprises objects (entities or things) provided with a radio interface structure for transmitting and receiving signals, which is connected to a chipset-type device that contains, in a memory, encryption keys, typically public keys, the object identifier, and other parameters that will be defined below.

It is important that the chipset is a secure chipset, like, for example, a SIM card or other counterfeit-proof chipsets.

The radio interface may be an RFID, or a Bluetooth, Wi-Fi, LTE or 5G connection system or future evolutions thereof, or the like.

Reception activation on the chipset applied to the object may be triggered by an electromagnetic transmission capable of activating the reception function, which can be implemented by using known technologies.

For example, semi-active RFID systems may be employed, which utilize the carrier of the transmission system to reply to the interrogation/activation, and which are typically powered by a battery and consume little power. An active RFID may be used as well. Even completely passive RFID systems may be used. It is also possible to use a small photoelectric cell which, when illuminated by the flash of a camera, for example, will activate the transmission/reception circuit of the system affixed to the object. The chipset and its radio interface may be either hidden within the object or visible.

The three-layer system may be implemented by using user and object authentication techniques aimed at providing different service levels or types on the basis of the rights and authorizations owned by the users in relation to a specific object or entity.

In a specific embodiment, virtual reality (VR) and/or augmented reality (AR) contents associated and connected with the previously identified and authenticated object can be displayed on the user equipment (e.g., a smartphone).

For a design object or a fashion object, for example, a content may be received on a device which will allow seeing the object in a specific environment (VR environment), conceived and/or authorized by the owner of the object, and/or displaying the object enriched in its design (AR) thanks to video or image contents also conceived and/or authorized by the holder of full rights on the object (i.e., the owner of the object).

Customization of contents, whether images or videos, in any format, is only possible on the basis of rights of ownership of the object. On the contrary, visualization of the same is possible for anybody or, still in general terms, only for those that are "friends" of the object owner on some social platform.

The customization of the enriching content provided, for example, in augmented reality mode is specific for the object, not for the object type: each object is unique thanks to both the identifier stored in the memory of the chipset affixed to the object itself and the peculiar characteristics of the contents enriching it, such contents being specific for that object.

Therefore, although the object may be an industrial product, it will differ from the other objects belonging to the same product line for the very presence of the enriching contents, e.g., in augmented reality, which characterize its uniqueness.

Alternatively, the uniqueness of the object may be characterized by its image and also by a specific game associated with it, perhaps having specific graphics, which can be played simultaneously by different users, so long as they hold the right to. The game or the graphics, whether in AU or VR mode, or the like, will be accessible from the user equipment, e.g., a smartphone. Said smartphone will display the object through its camera and will receive the AU and VR data or the game, which will all be displayed on the screen as if they were a single object consisting of a physical part, displayed via the camera, and a digital part, sent from the platform (layer 1) and stored in the database.

The holder of all rights on the enriching contents (or the VR in which the object is displayed, or the gaming) is the owner of the object, who will have the power to modify such contents and allow them to be viewed by specific categories of users, e.g., as aforesaid, his/her friends on a given social network. Authorizations may also be handled on an on-demand basis, i.e., from time to time according to the received requests.

Several types of means are therefore available for visualizing the object: the object may be displayed with a simple enriching content; the object may be entered into a virtual reality context, with or without enriching contents; or a game may be activated which represents a virtual reality with gaming interaction mechanisms, in which the object is entered with or without augmented contents.

The visualization of the object in the different above-described contexts may be either simple or immersive, depending on the peripherals, the sensors and the devices in use. VR and AR are considered to be immersive when all or most human senses can be used for enriching or virtualizing the reality. Depending on the peripherals, the sensors and the fruition devices employed, therefore, the present patent may cover both simple and immersive AR and VR visualization cases.

Identification and authentication of the object occur by means of authentication numerical identifiers and keys, stored in the chipset memory, and via simultaneous visual recognition of the object. To do so, it is necessary to acquire, by means of a camera of a user device belonging to the second layer (layer 2), a digital video or image of the object. By way of example, visual recognition may occur by extracting one or more fingerprints from the image or, even better, from the video of the object. The "digital video fingerprinting" referred to herein is a per se known technique that uses software to identify, extract and synthesize the characteristic components of a video for the purpose of enabling the identification of such video.

The fingerprint is extracted from the video of the object acquired by the user device, and is compared on the first layer with the fingerprint stored, for that specific object, in the database on the first layer. Typically, the fingerprint stored on the first layer is extracted from the image or video of the object during the production of the object or the configuration of the service.

In addition to fingerprinting, other known methods are currently available for visual recognition of objects, which are based on machine learning techniques or true artificial intelligence techniques. The identification and authentication technique of the invention envisages, therefore, the use of authenticated messages exchanged between the object, the user device and the platform, and simultaneous visual recognition of the same object based on fingerprinting or other AI (Artificial Intelligence) techniques, or a combination of both techniques (i.e. a combination of the fingerprinting technique with AI techniques used for visual recognition).

In this manner, bidirectional intercommunication between the three layers is achieved for exchanging information or data.

The method of the invention, which uses the above-described system, therefore comprises the following phases:
  a) identification and authentication of the serial identifiers of the object and concurrent identification of the image thereof;
  b) verification of the rights of the person who has identified and authenticated the object;
  c) provision of the service, the fruition of which typically occurs on the user device (layer 2);
  d) phase c) may constitute a further and fast means of identification and authentication of the object based on visual recognition, wherein other object-specific data (e.g., augmented reality data) are associated with the object, which characterize the individuality and uniqueness thereof.

The visual recognition performed in phase d) operates as follows:
  once the augmented reality or virtual reality data have been received, which data may constitute, for example, images or videos, the union of the augmented reality images or videos with the video of the physical object results in a single image or video of the object "enriched" with the new data.

The two video components, i.e., the one of the physical entity and the one of the augmented (or virtual) reality, constitute the base from which a general visualization can be extracted, referred to herein as "holistic" visualization, which provides a new mode of identification and authentication based on, for example, fingerprinting (or another visual identification technique) of the physical object.

The combination of the data of the physical object with a specific virtual/augmented reality is treated as a single entity.

In substance, a fingerprint can be extracted not only from the video of the physical object, but also from the union of the same with augmented/virtual reality videos and images.

The visual recognition performed in phase d), as specified for phase a), may utilize, instead of the fingerprinting technique, current techniques based on AI (Artificial Intelligence) algorithms for recognizing videos or images.

Any reference below to visual recognition will implicitly involve, in addition to common fingerprinting techniques, also techniques based on AI algorithms and typical evolutions thereof.

Figure 2:
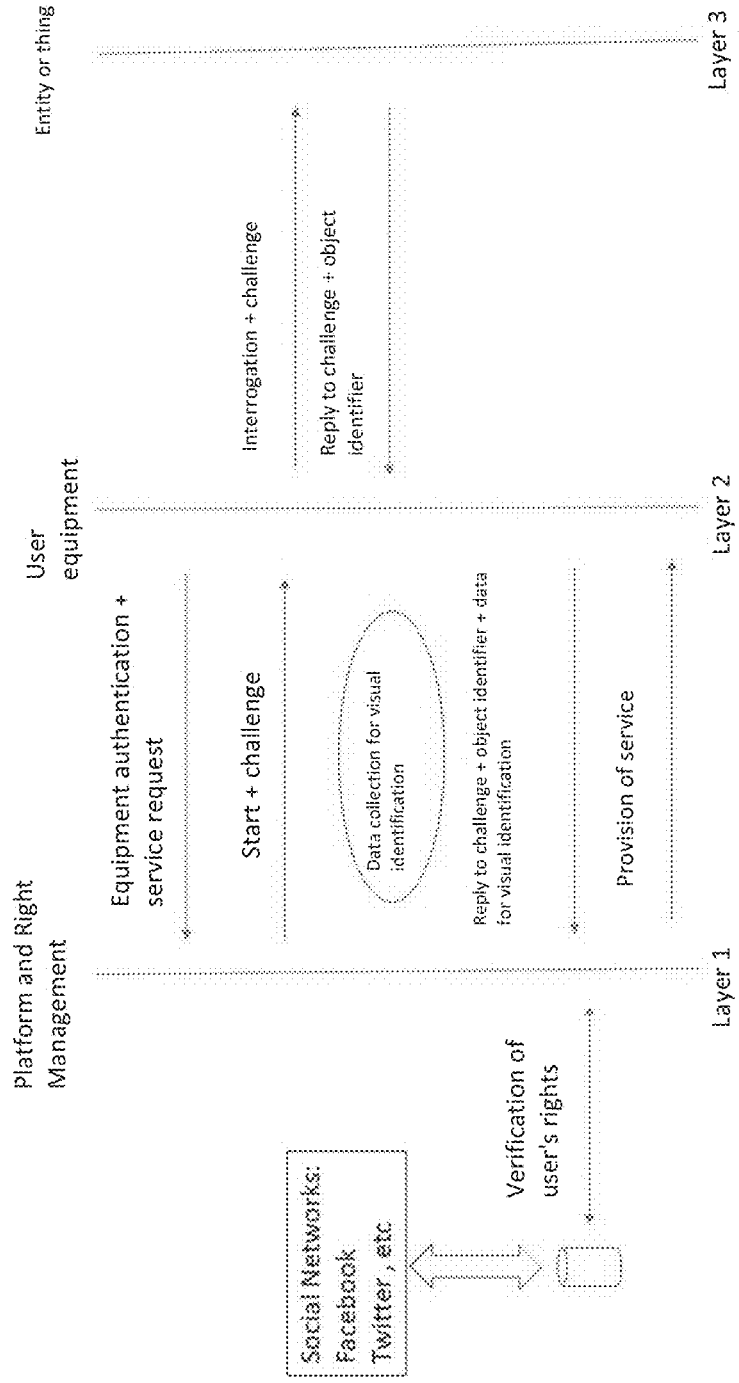

FIG. 2 illustrates the above-described method. Initially, from layer 2 a user device initiates a request for starting the service, after having been authenticated by the service platform on layer 1.

This is a technique for mutual authentication between the platform and the user device which utilizes known authentication techniques based on public-key algorithms and digital certificates provided by a certification authority (CA) in appropriate formats, such as, for example, the X.509 format as proposed by ITU-T (International Telecommunication Union—Telecommunication Standardization Bureau). Multiple digital authentication techniques are available, and techniques other than those of the standard X.509 format may be used for meeting lower or higher security requirements. The method of the present invention is independent of the specific digital authentication techniques that may be used, which will evolve over time.

Once the registered user has been recognized and the access device has been authenticated, the platform (layer 1) sends an interrogation message and a challenge to the user device (layer 2), which in turn forwards them to the physical object (layer 3) whereto the chipset has been affixed. The first message from the user device to the object is also useful for activating the chipset affixed to the object.

The radio interface of the system affixed to the layer-3 object may use, for example, a passive antenna which, when energized via radio by the active antenna of the layer-2 user device, will turn on and communicate with the latter antenna after having activated the local power supply and interpreted the challenge by using the encryption keys that were stored in the chipset during the initial configuration of the service.

After having received the reply to the challenge from the system affixed to the object and the object identifier (which identifier may also have been encrypted with the public key of the layer-1 platform), and before sending said reply to the layer-1 platform, the user device acquires, by means of its own camera, a video or an image of the object.

Some parameters that define, for example, how the object should be framed in order to acquire the video may be communicated from the layer-3 object to the user device (layer 2). Such parameters may include the distance from which the video should be taken, the shape of the object, etc. Instead of being supplied by the chipset system affixed to the layer-3 object, said parameters may alternatively be directly supplied by the layer-1 platform in its reply to the first service request made by the layer-2 user device.

Figure 2A:
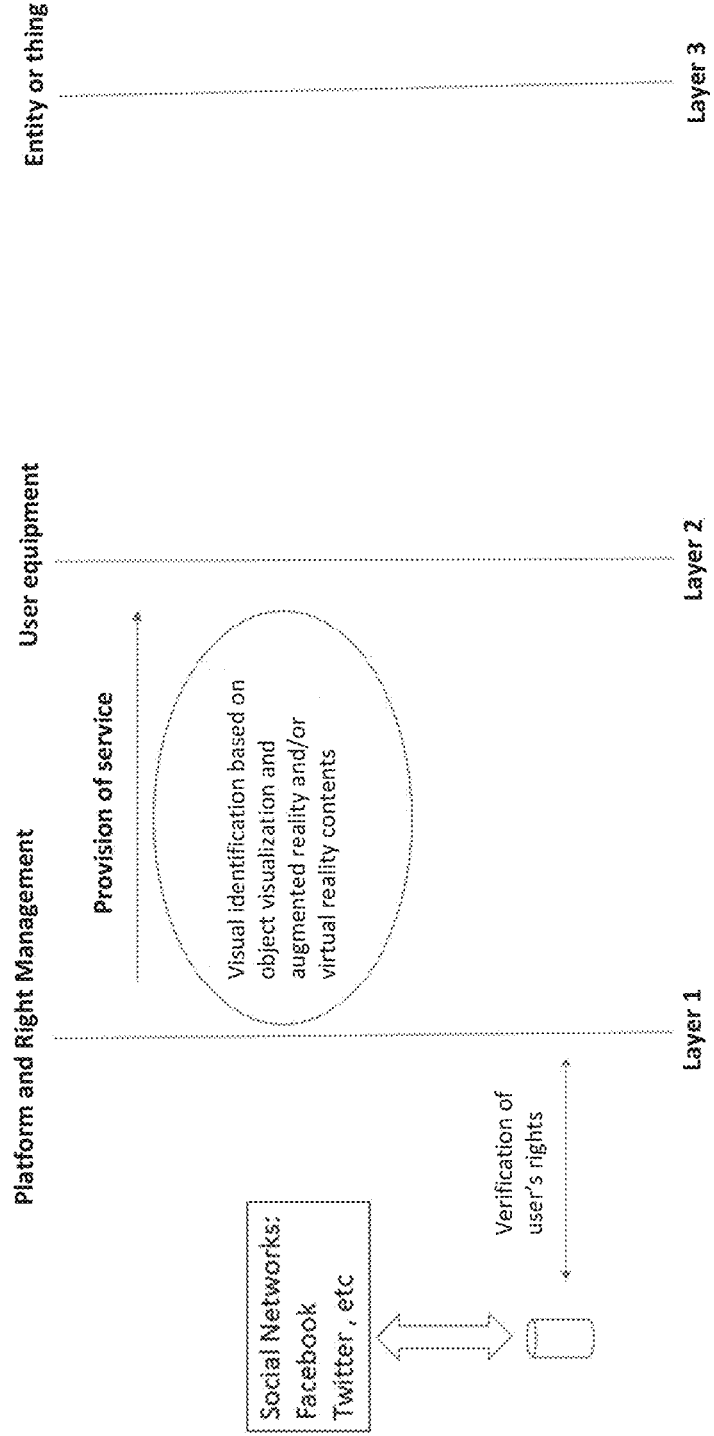

As illustrated in FIGS. 2 and 2a, after the information (videos and/or images) necessary for the visual identification of the object has been acquired, such information is sent, along with the reply to the challenge and the object identifier, which may optionally be encrypted, to the layer-1 platform.

If not yet done by the mobile device, the layer-1 platform performs the visual identification of the object by comparing the received information with the information stored in the database for the object associated with the identifier just received.

It is also verified if the user device has the right to use services associated with the object identifier. To this end, the settings of the rights associated with the object identifier (ID) are checked and it is verified if there is a relationship with the authenticated user who is using the layer-2 user device. By way of example, it is verified if an authenticated user A is the owner of the object identified and authenticated by ID and visual recognition, in which case the user A will have full rights on the identified object.

If A is not the owner, it will be verified is the owner wishes to allow other people to make use of some services, e.g., those included among the "acquaintances" or "friends" on a given social network platform (Twitter, Facebook, etc.) or other categories.

In this case, the layer-1 platform will access a social network platform designated by the holder of the rights on the object and will verify that there is an actual relationship and a right associated therewith which may allow the user A to use all or some of the services associated with the object identified as shown in FIG. 2.

It is also possible to directly interrogate the owner of the object to ask, in real time, if he/she wishes to grant the user A access to the services.

Figure 2B:
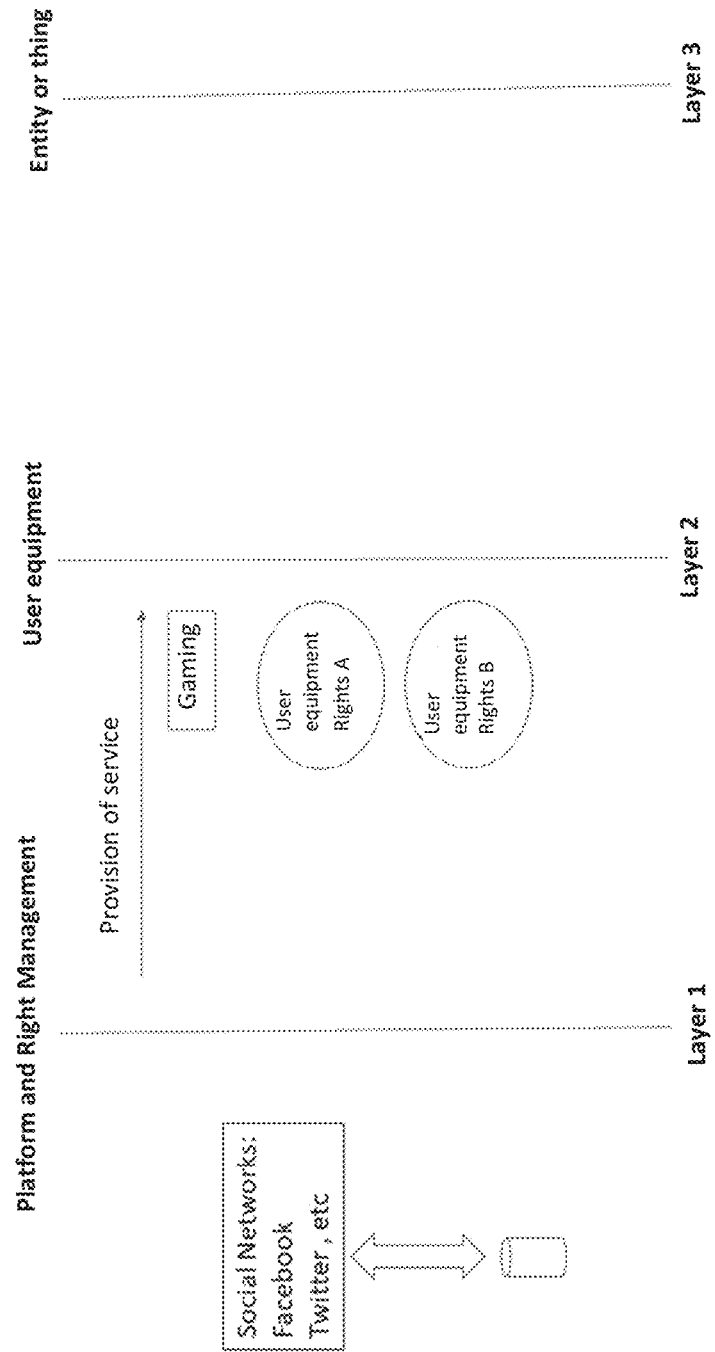

If access to the services is granted—as shown in FIG. 2a and in the specific case of provision of data and games shown in FIG. 2b—a message containing the data (whether AR or VR data or a real game) about the object will be sent to the user device A.

One service example consists of games that, when used in virtual reality contexts, make use of the object in the game.

Another example is the enrichment of the design of the object by adding graphics or videos. See the example of FIG. 3, wherein the object is placed in a virtual reality context or a graphic context with AR images in the presence of hyperlinks and/or with the possibility of navigating and interacting in the VR scenario.

AR scenarios often include hyperlinks that allow interaction with the presented items.

The video or the images enriching the design of the object may have a high-level aesthetic characterization that will make a piece of design even more beautiful.

Finally, a game may utilize the object within a virtual reality, enriched with a number of aesthetic additions.

The owner of the object has also, among his/her own rights, the right to modify and customize the object enriching contents (modifying augmented reality contents) or the possibility to modify or configure the game in which the object has been inserted.

A typical application of the method of the present invention involves two or more users, one of whom may be the owner of the object, who establish an actual gamification with additional functions or games using the object within virtual reality contexts. Such gamification constitutes an indirect verification that the object is authentic and non-counterfeit.

As illustrated in FIG. 2b, the additional or enriching data—including any virtual reality contexts that may constitute a background where the object is inserted—constitute, in conjunction with the object itself, the base for a unique visual identification.

In case of phase d), therefore, an acquisition of a video or images is performed in order to visually identify the object, which in this case will not need to transmit its own identifier stored in the chipset because the enriched image (or video)

and the object itself will constitute an unique item when compared with other objects of the same series and type.

The object enriching data, being peculiar for that specific object and unique, i.e., different from the enriching data associated with other objects, even belonging to the same product line, allow, in conjunction with the object itself, for fast and easy identification and authentication.

By way of example, a user who has identified and authenticated the object may, having received the object enriching data (or having activated a game based on the enriching data), offer the identification of the enriched object also for third parties. Said third parties may, in fact, display the object in the AR or VR enriched reality or in the game and, by visual recognition, quickly identify the object inserted in its digital context.

In a specific embodiment, the visual recognition by means of the above-described fingerprinting or AI techniques, or a combination thereof, is carried out on the user device. In this case, instead of sending the video (or the image) of the object, the user device will send the result of the visual recognition to the layer-1 platform in order to have it verified that the visual recognition matches the information stored in the database.

In a specific embodiment, the procedure is articulated as follows among the three layers of the system.

From an application installed in a user's mobile device (e.g., a smartphone), access is gained to the layer-1 platform over a secure connection. A secure connection is meant to be an authenticated connection using public-key encryption systems such as, for example, TLS ("Transport Layer Security").

Over said secure connection, the user device requests the platform to start a given procedure. The procedure type may vary, and is specified in the message. The procedure described below is a general interrogation procedure, or INT GEN, as indicated in FIG. 4.

The INT GEN message will include a specific service request, which may be of different types: visualization of information in AU, VR, games, etc.

The layer-1 system, i.e., the service platform, upon receiving the request from the application in the user device, verifies the authenticity of the user registered in the database and then sends, in reply, a token signed with its own private key. In said reply, the message fields will also contain further information, e.g., a specific embodiment may include information necessary for performing the authentication of the user device. The token is generated by using common techniques, which make the token number pseudo-random, with which a time stamp and other typical information may be associated as necessary.

Figure 4:
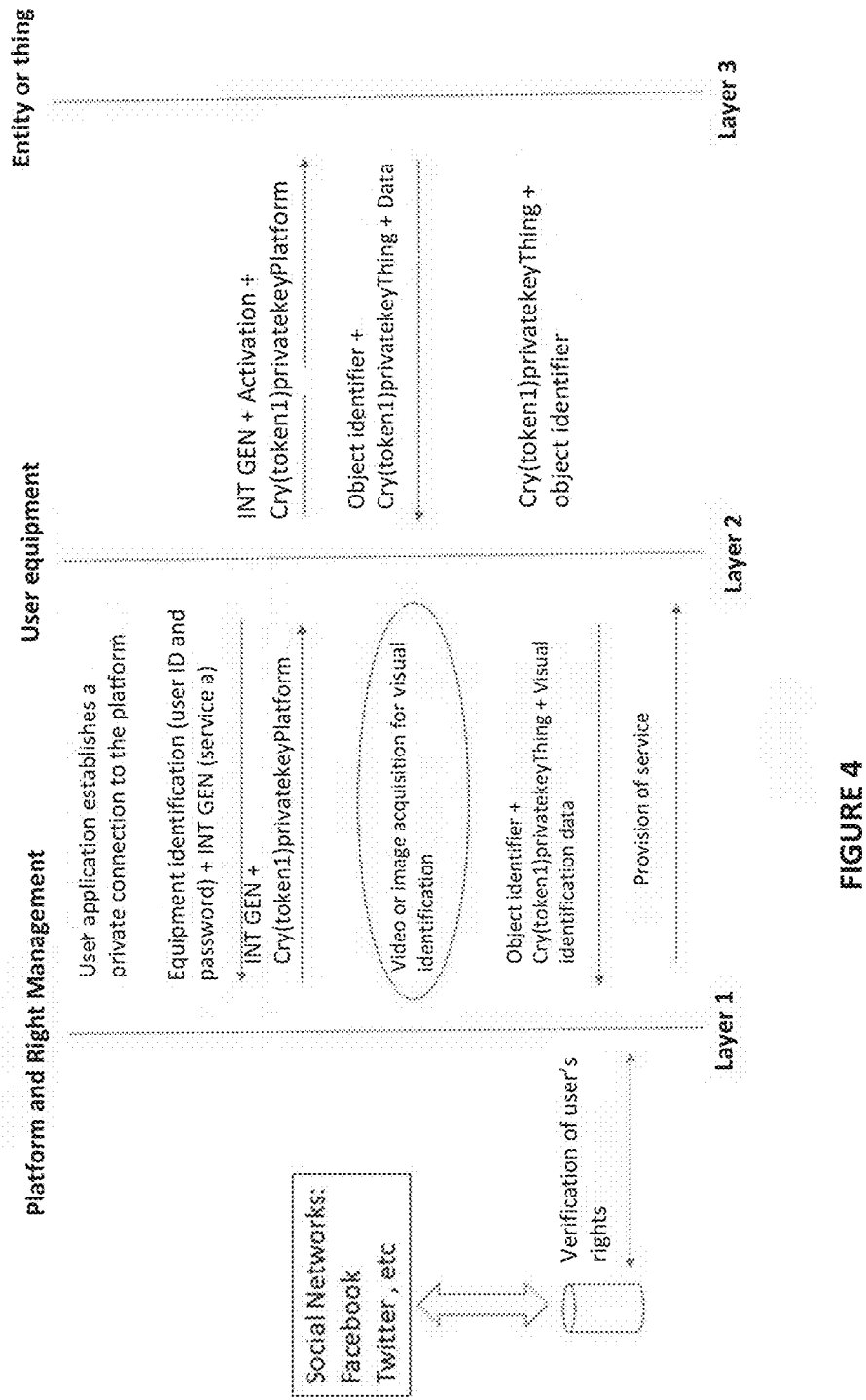

When signed with the private key of the layer-1 platform, the token is indicated in FIG. 4 as Cry(token1) privatekey-Platform (i.e., token1 is encrypted by using the platform's private key). Said message is forwarded by the user device to the layer-3 object.

This first message is also used for activating the reception apparatus of the layer-3 object. For example, if the apparatus affixed to the layer-3 object includes a semi-passive RFID, the first transmission will turn on the reception system and the power supply of the chipset connected thereto. The secure chipset affixed to the object (e.g., a SIM card) stores the public key of the layer-1 system, i.e., the certificate of the layer-1 platform. With said public key, the system affixed to the object decrypts the message Cry(token1), thereby reading token1 and verifying that it is valid.

The system affixed to the object replies by entering into the reply message, for example, the following information fields: token1 encrypted with the private key of the object (Cry(token1) privatekeyThing), a clear general identifier of the object (ID), and a set of parameters (also referred to as Data hereinafter and in the figures), which are useful to indicate to the application in the mobile device the modes of extraction of the fingerprinting information of the object, or at any rate the information necessary to permit a proper visual identification of the object (when AI techniques are also used for the visual recognition). For example, such parameters may be, without being limited thereto, the distance, the shape or the geometric outline of the object, or the angle from which the fingerprinting information should be extracted.

These parameters allow the application in the user device to automatize the fingerprinting acquisition modality. For example, the user can see on his/her own device the outline and the angle from which the acquisition of the video (or image) useful for extracting the fingerprinting information should occur. Once the video (or one or more images) has been acquired, the device will send the received information (i.e., Cry(token1) privatekeyThing, ID, Data and the video) to the layer-1 platform by using the secure connection established when the procedure was started.

In a specific embodiment, the fingerprinting process, or more generally the video recognition, may occur on the user device. In this case, the layer-1 platform will only be sent the result of such recognition, instead of the whole video.

In a specific embodiment, the user device has received, in the reply to the first message for starting the procedure, the data necessary for verifying, on the user device itself, the visual recognition; therefore, once the visual recognition has been completed on the user device, such recognition will be compared with the data received from the layer-1 platform. If the verification is successful, then the visual identification will be passed.

As aforementioned, many digital authentication techniques are available and, therefore, dynamics other than the one described herein may occur in the exchange of messages among the layer-1 platform, the layer-2 user device and the layer-3 objects or entities, also on the basis of specific security requirements, which may be more or less severe. Anyone skilled in the art of digital security may modify the dynamics of the messages related to the digital authentication of the identifier contained in the layer-3 physical entity, but said digital authentication will not be sufficient to prevent product counterfeiting, because the digital identifier is contained in a tag, a chipset or the like, which still remains liable to physical removal or substitution. The present invention solves this problem by indissolubly binding the object's characteristics, such as shape, colour, product accessory arrangement, to its digital identity.

In a specific embodiment, also the digital authentication of the physical entity or object may occur on the user device, in which case the user device receives from the central platform (layer 1 in FIG. 2), in the initialization data message, also the keys necessary for authenticating the reply message that it will receive from the physical entity. Typically, this specific embodiment with authentication of the physical entity on the user device is only allowed by the layer-1 central system when the user device has full rights (e.g., of ownership) on the layer-3 physical object. If both verifications conducted on the user device, i.e., visual recognition and digital identifier authentication, are successful, then the layer-3 object will be directly authenticated by the user device, which will communicate such authentication to the layer-1 platform in the first reply message.

In another embodiment, the platform performs both the identification and the authentication, i.e., the platform receives the object identifier (ID) forwarded by the user device and, by accessing the database, extracts the public key corresponding to the object ID; with such key it then decrypts the message in order to verify that token1 is actually the one that was sent as a recognition challenge. Furthermore, the platform performs the visual recognition of the object on the basis of the received video (or images) by using either artificial intelligence techniques or fingerprinting techniques, or a combination thereof.

In a specific embodiment, the platform may receive the visual recognition directly from the user device. The platform compares the received (or made, according to the case) visual recognition with the one stored in the database in association with the object whose identifier ID it has received. If the visual recognition is successful, and if the received token matches the one that was sent, then the object can be considered as identified and authenticated and it will be possible to verify which rights are held by the user who started the general interrogation for the object. In a specific embodiment, the object identifier may have a first identifier, which is sent in clear form by the object, and a second identifier, which is encrypted by using the object's private key.

In the proposed system, it can generally be stated that key-based authentication and visual recognition can be performed on both the layer-1 platform and the layer-2 user device, if the latter has previously received from the platform the reference information useful for the visual recognition and the keys. Several combinations are possible due to the flexibility of the system, i.e., visual identification on the user device and authentication based on encryption keys on the platform, or the opposite: visual identification on the platform and authentication based on encryption keys on the user device. Of course, other combinations are also allowed: both verifications on the user device or, as already described, both verifications on the layer-1 platform.

After the database has been interrogated as to the rights associated with that specific user in relation to that specific object, several cases may occur. A few of the many possible cases will now be mentioned merely by way of illustrative example.

For example, the user may be the owner of the object and have full rights on the object, if he/she is of age. If the user is not an adult, he/she may not have full rights on the object. The user may be a friend, or an acquaintance, of the owner of the object on a given social platform (Facebook, Twitter, etc.). In order to verify this status, the user must have granted the platform access to his/her contacts on that specific social platform, so that it is possible to verify the existence of a relationship with the person that will make the interrogations.

If the user is a contact certified by the social platform, then he/she will be granted access to certain services related to the object. For example, without limitation, games, augmented reality (or virtual reality) information or services may exist which can be accessed by the user by means of said interrogation of the object. Should no relationship exist between the user who started the procedure and the owner of the object, then the level of the services or games or information that can be displayed may vary extensively according to the rights that the owner of the object decided to grant.

If the object is not identified and authenticated, then the platform will reply to the interrogation started by the user by signalling that the object is a counterfeit one.

If the object is authenticated and identified, then the platform will allow the user to gain access to services, contents or games in diversified modalities, according to said user's rights on the object.

Merely by way of example, the user who interrogated the object may, for example, access and participate in a game owned by the owner of the object. The owner of the object may then allow third parties to gain access, via said interrogation, to games or information that he/she decided to bind to his/her availability of the object. In this example, the person who started the interrogation will receive in response a game which he/she can play in real time either alone or together with the owner of the object or other similarly entitled users.

Still by way of example, the person who started the procedure may receive, instead of a game, AR and VR information in which the object itself is placed, for example, so as to enrich the image or use thereof.

Figure 3:
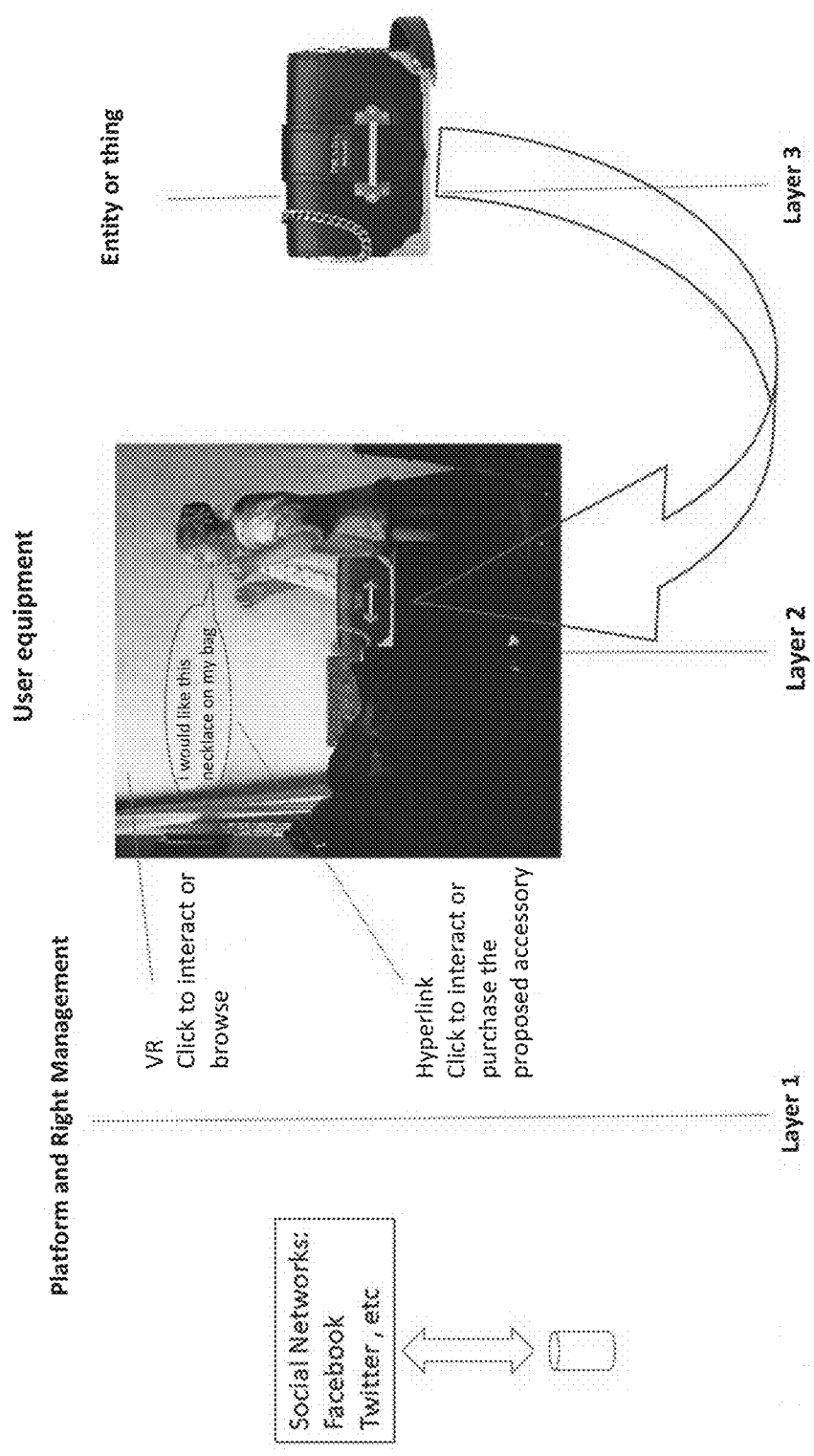

Hyperlinks may be entered into the AR or VR contents, which can be clicked by the user to interact with or browse the contents, as shown in FIG. 3.

AR may, for example, permit displaying, while the object is being displayed on the screen of the user device (e.g., the smartphone), other information which is typical and characteristic of the object in question, or even accessories for the object or the like, which could make it more precious or useful.

In one embodiment of the present invention, the AR may display some (or all, if the number thereof is acceptable) accessories for the object, and the user may decide, by clicking on the accessory displayed in AR, to activate a process for displaying or even purchasing the displayed accessory, as schematized in FIG. 3. The accessory may also be purchased by a user other than the owner of the object, if he/she displays the object with his/her own user device with the associated AR (or VR, etc.).

In a specific embodiment, the purchase procedure requires also the indication of the beneficiary of the purchase of the item displayed in AR.

In a specific embodiment of the present invention, instead of making the above-mentioned general interrogation INT GEN, the user who is activating the procedure may apply for purchasing the object from the holder of the rights on the object. The procedure will start with a different initial message: INT BID (interrogation for product acquisition), as opposed to a general interrogation. The first part of the procedure, i.e., the one concerning the authentication and identification of the object, is the same as the one described for INT GEN, see FIG. 4.

Figure 5:
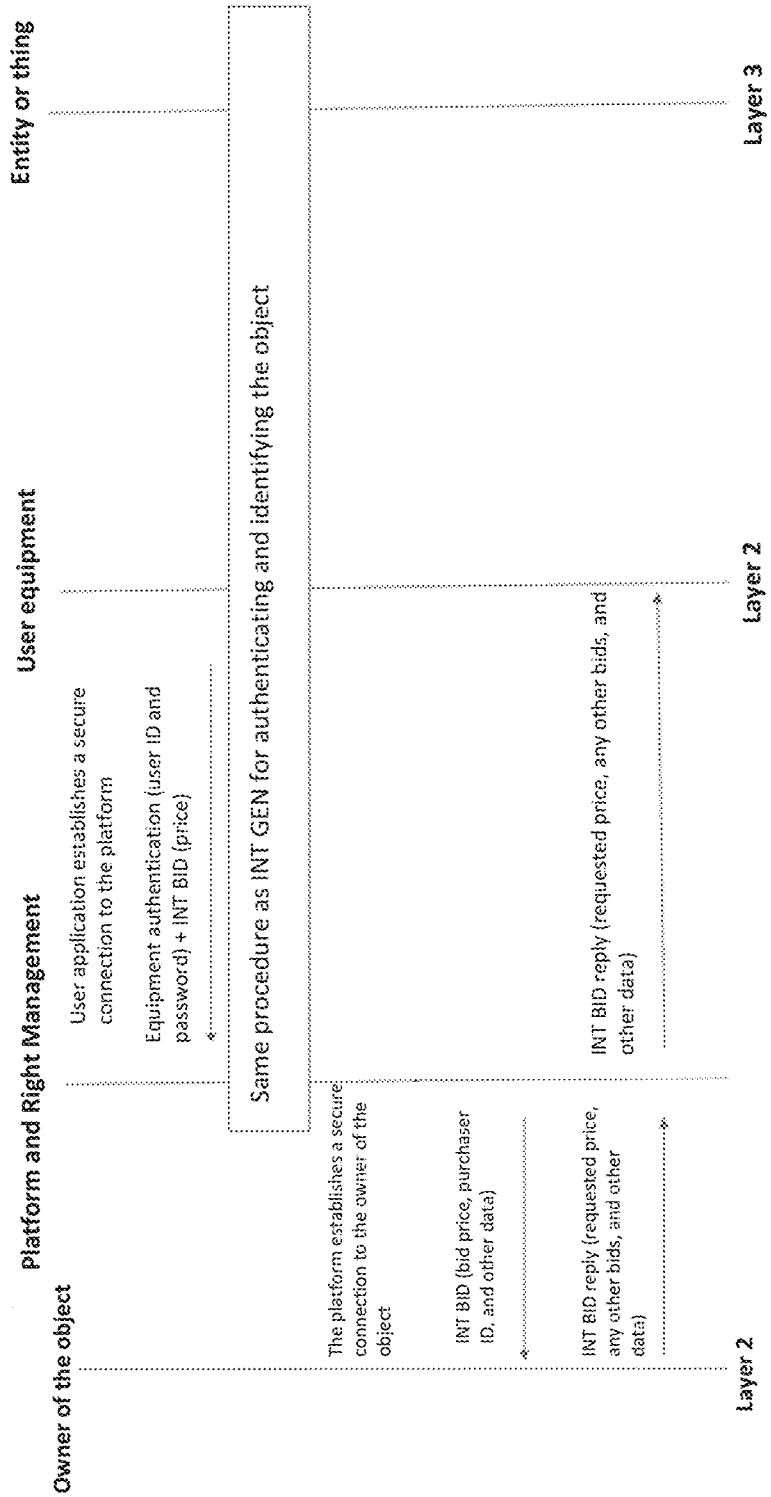
Figure 5B:
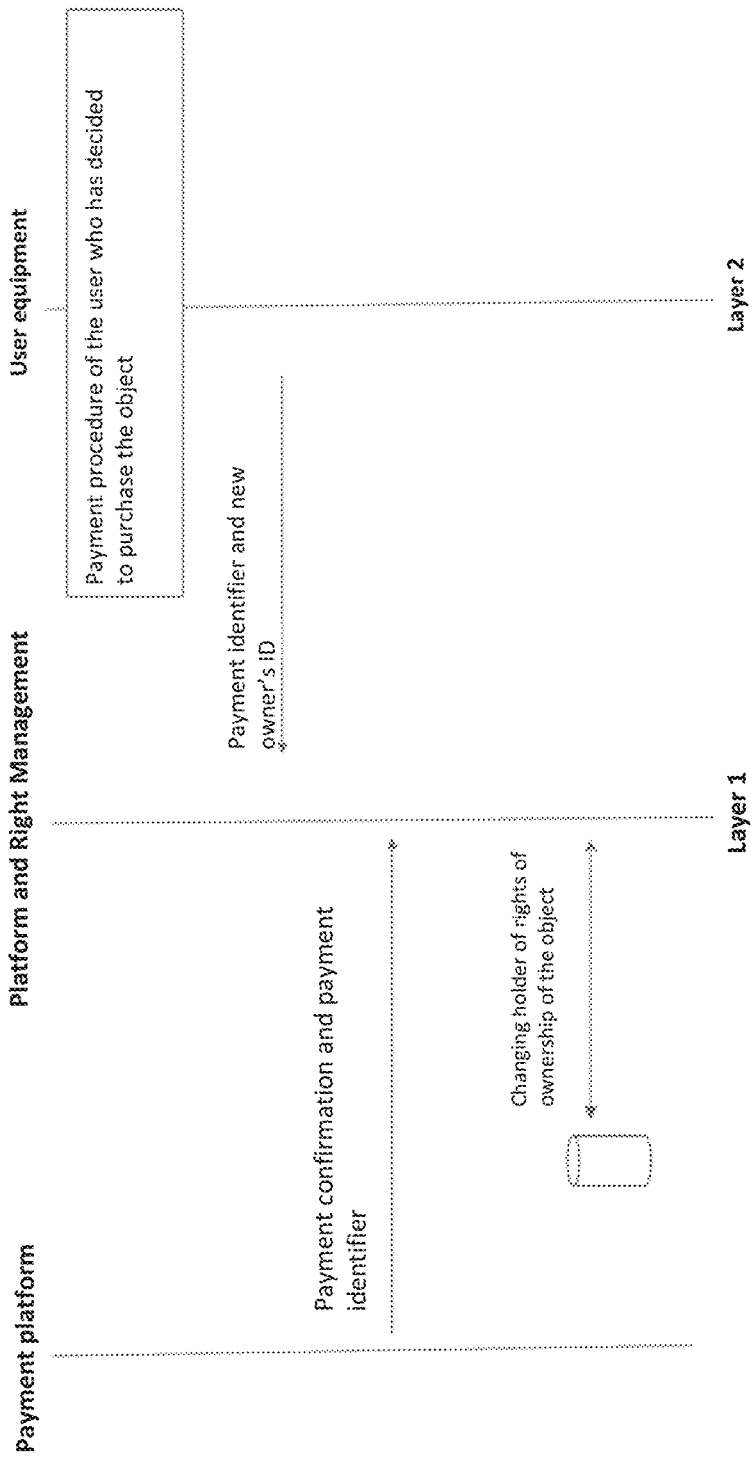

The reply sent from the layer-1 platform to the user who activated the INT BID procedure contains an actual payment proposal, with a price requested by the owner of the object. The INT BID procedure is illustrated in FIGS. 5 and 5b.

The owner of the object may have set beforehand the reply and the price that he/she intends to ask for selling the object, or he/she may reply in real time to the interrogation. In this latter case, the layer-1 platform will, prior to replying to the received interrogation, send a message to the owner of the object to verify if he/she wishes to sell the object and at which price. If the user replies affirmatively, the requested price will be forwarded to the user who started the procedure. If the user who started the procedure accepts to pay the requested price and the object is sold, then the layer-1 platform will update the property rights of the object, i.e., it will record into the database that the identified and authenticated object is now the property of the user who started the purchase procedure or another user designated by the payer, as shown in FIG. 5b.

The object payment procedure is integrated into the INT BID procedure, but will not be described herein because it uses technological solutions commonly available on the market. Payment may occur either concurrently with or prior to the transfer of the right of ownership, and the platform will notify the parties when the transaction has taken place.

A specific embodiment of the present invention envisages the following procedure for transferring the rights of ownership of the object without a payment being made at system level; for example, the object may be transferred for free.

Figure 6:
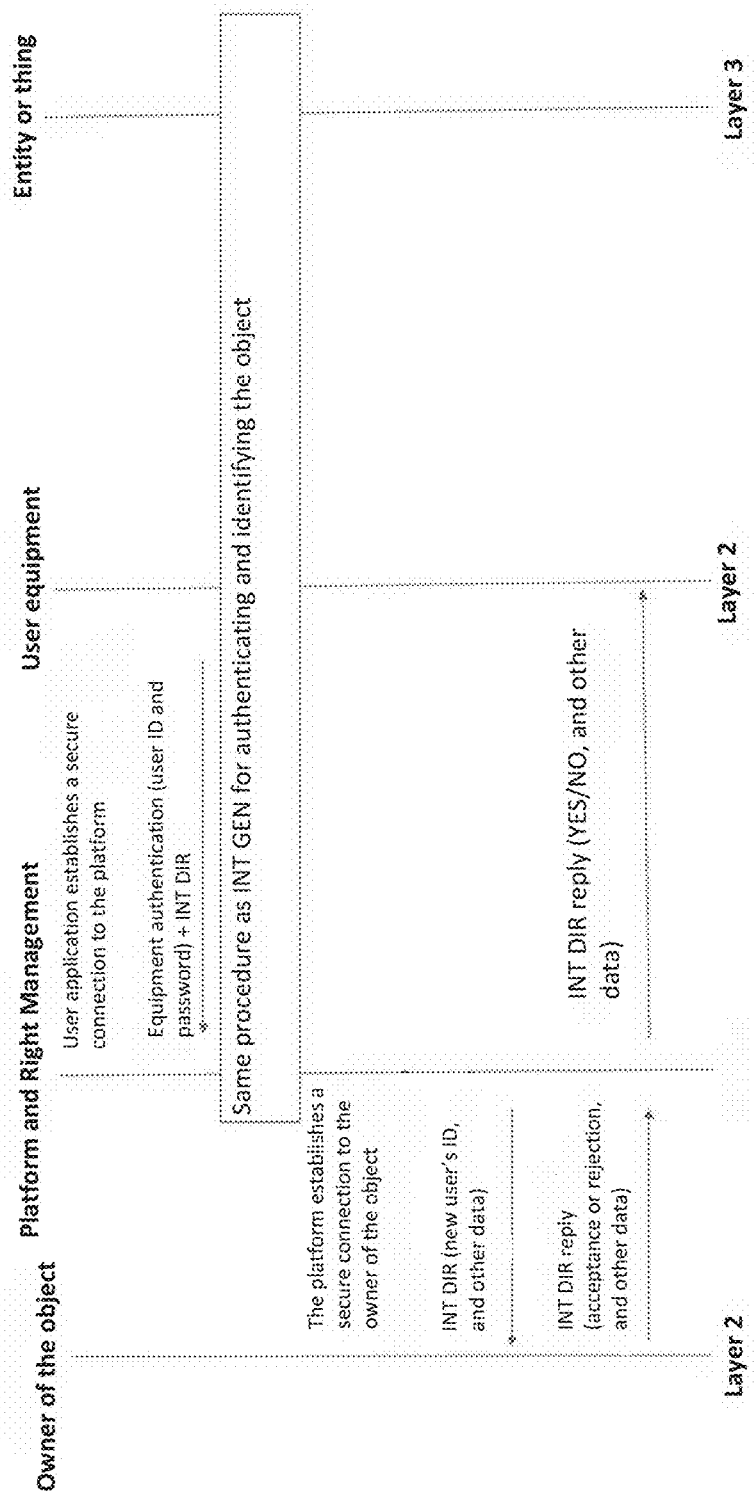

The user who wants to purchase the rights of ownership sends to the layer-1 platform a message, referred to as INT DIR, that may refer either to a free-of-charge transfer of the object or to a payment for the object outside the procedure managed by the layer-1 platform. Upon the initial interrogation INT DIR, the layer-1 platform activates the object identification and authentication procedure described for the INT GEN procedure. The INT DIR procedure is illustrated in FIGS. 6 and 6b.

Once the object has been authenticated and identified, the platform interrogates the holder of the rights on the object and asks if he/she intends to transfer the rights of ownership of the object to the user who activated the procedure. If the holder of the rights decides to transfer them, then the platform will record into the database the new holder of the rights of ownership and will notify the parties about the transaction.

The present invention can advantageously be implemented by means of a computer program, which comprises coding means for implementing one or more steps of the method when said program is executed by a computer. It is understood, therefore, that the protection scope extends to said computer program and also to computer-readable means that comprise a recorded message, said computer-readable means comprising program coding means for implementing one or more steps of the method when said program is executed by a computer.

The above-described example of embodiment may be subject to variations without departing from the protection scope of the present invention, including all equivalent implementations known to a man skilled in the art.

The elements and features shown in the various preferred embodiments may be combined together without however departing from the protection scope of the present invention.

From the above description, those skilled in the art will be able to produce the object of the invention without introducing any further construction details.

What is claimed is:

1. A method for identification and authentication of objects, comprising:
providing a central electronic system, including a database;
providing at least one electronic user device;
providing one or more physical entities, each physical entity being equipped with a message reception and transmission system comprising a secure chipset storing digital identifiers and encryption keys of said physical entity;
said at least one electronic user device interrogates said central electronic system in order to receive authentication data of one or more of said physical entities, entered in said database; in reply, said at least one electronic user device receives said authentication data and sends authentication request messages to said one or more physical entities;
said at least one electronic user device receives replies to said authentication request messages from at least one of said one or more physical entities, comprising parameters and digital identifiers of said one or more physical entities and, based on said parameters, performs an acquisition of at least one video image of said one or more physical entities;
either
said at least one electronic user device sends said replies and said video acquisition to said central electronic system;
said central electronic system extracts from said replies a digital identity of said at least one or more physical entities and, based on encryption keys contained in said database, authenticates a digital identity of said at least one or more physical entities, and performs a visual recognition of said video acquisition by using fingerprinting (FR) and/or artificial intelligence (AI) techniques;
said central electronic system compares said visual recognition with data about said visual recognition contained in said database, comprising said authentication data; if the comparison is successful, then said central electronic system will identify and authenticate each one of said at least one or more physical entities;
or
said at least one electronic user device extracts from said replies a digital identity of said at least one or more physical entities and, based on encryption keys included in said authentication data received from the central electronic system, authenticates a digital identity of said at least one or more physical entities, and performs a visual recognition of said video acquisition by using fingerprinting (FR) and/or artificial intelligence (AI) techniques, and compares said visual recognition with data about said visual recognition received from the central electronic system; if the comparison is successful, then said at least one electronic user device will identify and authenticate each one of said at least one or more physical entities.

2. The method for identification and authentication of objects as in claim 1, wherein said central electronic system verifies rights owned by said at least one electronic user device for the purpose of making said comparisons of the interrogated, identified and authenticated physical entity.

3. The method for identification and authentication of objects as in claim 2, wherein, based on said rights, said central electronic system provides one or more gamification services and/or gaming services and/or virtual reality (VR) and/or augmented reality (AR) contents associated and connected with said at least one electronic user device.

4. The method for identification and authentication of objects as in claim 2, wherein said central electronic system grants said at least one electronic user device access to at least one social network platform for interaction with other user devices.

5. The method for identification and authentication of objects as in claim 3, wherein said at least one electronic user device is permitted to modify said contents and allow them to be played on other user devices.

6. The method for identification and authentication of objects as in claim 1, wherein said visual recognition comprises:

receiving augmented reality or virtual reality data as images or videos;

uniting said images or videos with images and/or videos of said one or more physical entities of the physical object, thereby forming a single image or video of said one or more physical entities enriched with said augmented reality or virtual reality data;

said union constituting a base from which a general visualization of said one or more physical entities can be extracted, as an identification and authentication modality.

7. A system for identification and authentication of objects, adapted for implementing the method according to claim 1, comprising:

at least one said central electronic system, including a database;

at least one said electronic user device;

said one or more physical entities.

\* \* \* \* \*